(12) United States Patent
Migita et al.

(10) Patent No.: US 10,958,137 B2
(45) Date of Patent: Mar. 23, 2021

(54) DRIVE DEVICE

(71) Applicant: Nidec Corporation, Kyoto (JP)

(72) Inventors: Takayuki Migita, Kyoto (JP); Yuki Ishikawa, Kyoto (JP); Shuhei Nakamatsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 158 days.

(21) Appl. No.: 16/323,632

(22) PCT Filed: Aug. 7, 2017

(86) PCT No.: PCT/JP2017/028552
§ 371 (c)(1),
(2) Date: Feb. 6, 2019

(87) PCT Pub. No.: WO2018/030325
PCT Pub. Date: Feb. 15, 2018

(65) Prior Publication Data
US 2020/0007009 A1 Jan. 2, 2020

Related U.S. Application Data

(60) Provisional application No. 62/372,411, filed on Aug. 9, 2016, provisional application No. 62/402,027, filed
(Continued)

(30) Foreign Application Priority Data

Mar. 31, 2017 (JP) .............................. JP2017-071396

(51) Int. Cl.
*H02K 9/193* (2006.01)
*H02K 11/225* (2016.01)
*F01P 3/00* (2006.01)

(52) U.S. Cl.
CPC ............ *H02K 9/193* (2013.01); *H02K 11/225* (2016.01); *F01P 2003/006* (2013.01)

(58) Field of Classification Search
CPC .. H02K 7/10; H02K 7/14; H02K 7/20; H02K 9/19; H02K 11/048
(Continued)

(56) References Cited

U.S. PATENT DOCUMENTS 6,039,551 A * 3/2000 Takeuchi ................ F04C 2/086
418/88
6,116,877 A 9/2000 Takeuchi et al.
(Continued)

FOREIGN PATENT DOCUMENTS

DE 11 2009 000 491 T5 3/2011
JP 62-29487 U 2/1987
(Continued)

OTHER PUBLICATIONS

Yamaguchi et al., "Drive Device", U.S. Appl. No. 16/323,643, filed Feb. 6, 2019.
(Continued)

*Primary Examiner* — Quyen P Leung
*Assistant Examiner* — Minki Chang
(74) *Attorney, Agent, or Firm* — Keating & Bennett

(57) ABSTRACT

In a drive device, a housing includes an outer lid that covers one side in an axial direction of a motor shaft. A pump includes an external gear fixed to an end on one side in the axial direction of the motor shaft, an internal gear surrounding a radial outside of the external gear and meshing with the external gear, a pump room recessed from a surface on the other side in the axial direction of an outer lid toward one side in the axial direction, the pump room accommodating the internal gear and the external gear, a suction port through which the oil is to be sucked into the pump room, and a
(Continued)

discharge port through which the oil is to be discharged from the pump room. The motor shaft includes a motor shaft body to which a rotor core is fixed and a closer fixed to the motor shaft body to overlap the internal gear and close at least a portion of the opening on the other side in the axial direction of the pump room.

8 Claims, 3 Drawing Sheets

Related U.S. Application Data on Sep. 30, 2016, provisional application No. 62/439,201, filed on Dec. 27, 2016.

(58) Field of Classification Search
USPC .................. 310/57, 58, 61, 62, 68 B, 156.05
See application file for complete search history.

(56) References Cited

U.S. PATENT DOCUMENTS

| | | | |
|---|---|---|---|
| 6,227,828 B1 | 5/2001 | Takeuchi et al. | |
| 6,739,850 B2 * | 5/2004 | Kawasaki | F04C 2/088 418/166 |
| 7,211,913 B2 | 5/2007 | Tsutsui et al. | |
| 7,828,095 B2 | 11/2010 | Murata et al. | |
| 8,360,186 B2 | 1/2013 | Yamamoto et al. | |
| 9,441,628 B2 | 9/2016 | Sakata et al. | |
| 9,762,106 B2 | 9/2017 | Gauthier et al. | |
| 10,060,432 B2 * | 8/2018 | Pippes | F04C 15/0026 |
| 10,690,134 B2 * | 6/2020 | Yamaguchi | F16K 17/04 |
| 10,746,172 B2 * | 8/2020 | Yamaguchi | H02K 5/20 |
| 2003/0070879 A1 * | 4/2003 | Pringle | F04C 2/102 184/6.28 |
| 2004/0200350 A1 | 10/2004 | Makino et al. | |
| 2007/0178292 A1 | 8/2007 | Hasegawa et al. | |
| 2012/0128513 A1 * | 5/2012 | Sakata | F04C 2/102 417/410.1 |
| 2013/0145879 A1 | 6/2013 | Nakamura et al. | |
| 2016/0153546 A1 | 6/2016 | Ogawa et al. | |
| 2017/0227006 A1 | 8/2017 | Lewis et al. | |
| 2018/0278103 A1 * | 9/2018 | Bernreuther | H02K 11/215 |

FOREIGN PATENT DOCUMENTS

| | | |
|---|---|---|
| JP | 2010-004603 A | 1/2010 |
| JP | 2010-252521 A | 11/2010 |
| JP | 2011-004487 A | 1/2011 |
| JP | 2013-055728 A | 3/2013 |
| JP | 2016-101042 A | 5/2016 |
| JP | 2016-181954 A | 10/2016 |
| JP | 2017-063542 A | 3/2017 |

OTHER PUBLICATIONS

Yamaguchi et al., "Drive Apparatus", U.S. Appl. No. 16/323,633, filed Feb. 6, 2019.
Yamaguchi et al., "Drive Apparatus", U.S. Appl. No. 16/323,636, filed Feb. 6, 2019.
Yamaguchi, "Drive Device", U.S. Appl. No. 16/323,638, filed Feb. 6, 2019.
Yamaguchi, "Drive Device", U.S. Appl. No. 16/323,640, filed Feb. 6, 2019.
Yamaguchi, "Drive Device", U.S. Appl. No. 16/323,641, filed Feb. 6, 2019.
Official Communication issued in International Patent Application No. PCT/JP2017/028552, dated Oct. 10, 2017.

* cited by examiner

DRIVE DEVICE

BACKGROUND OF THE INVENTION

1. Field of the Invention

The present disclosure relates to a drive device.

2. Description of the Related Art

There is known a rotary electric machine including a case in which a lubricating fluid for lubrication and cooling of a stator, a rotor, and the like is stored.

In some cases, a pump that sucks up oil stored in the case is provided in the rotary electric machine. The oil is sucked up by the pump to supply the oil to the rotor and the stator, which allows the rotor and the stator to be cooled. In this case, it is conceivable that a shaft of the rotary electrical machine and the pump are connected to each other to drive the pump using rotation of the shaft. However, in the case that the shaft and the pump are simply connected to each other, it is necessary to fix an external gear to the shaft after the shaft is inserted into a pump room, and therefore it may take time and effort to assemble the rotary electric machine.

SUMMARY OF THE INVENTION

A drive device according to an example embodiment of the present disclosure includes a rotor including a motor shaft disposed along a center axis extending in one direction and a rotor core fixed to the motor shaft; a stator radially opposed to the rotor with a gap interposed therebetween; a housing including an accommodation portion that is capable of storing oil while accommodating the rotor and the stator; and a pump driven through the motor shaft. The housing includes an outer lid that covers one side in an axial direction of the motor shaft. The pump includes an external gear fixed to an end on one side in the axial direction of the motor shaft, an internal gear surrounding a radial outside of the external gear and meshing with the external gear, a pump room recessed from a surface on the other side in the axial direction of the outer lid toward one side in the axial direction, the pump room accommodating the internal gear and the external gear, a suction port through which the oil is to be sucked into the pump room, and a discharge port through which the oil is to be discharged from the pump room. The motor shaft includes a motor shaft body to which the rotor core is fixed, and a closer fixed to the motor shaft body, and the closer overlaps the internal gear in axial view, and closes at least a portion of an opening on the other side in the axial direction of the pump room.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A Z-axis direction illustrated in each drawing is a vertical direction Z in which a positive side is set to an upper side while a negative side is set to a lower side. In the embodiment, the vertical direction Z is an up-and-down direction in each drawing. In the following description, the vertically upper side is simply referred to as an "upper side", and the vertically lower side is simply referred to as a "lower side".

Figure 1:
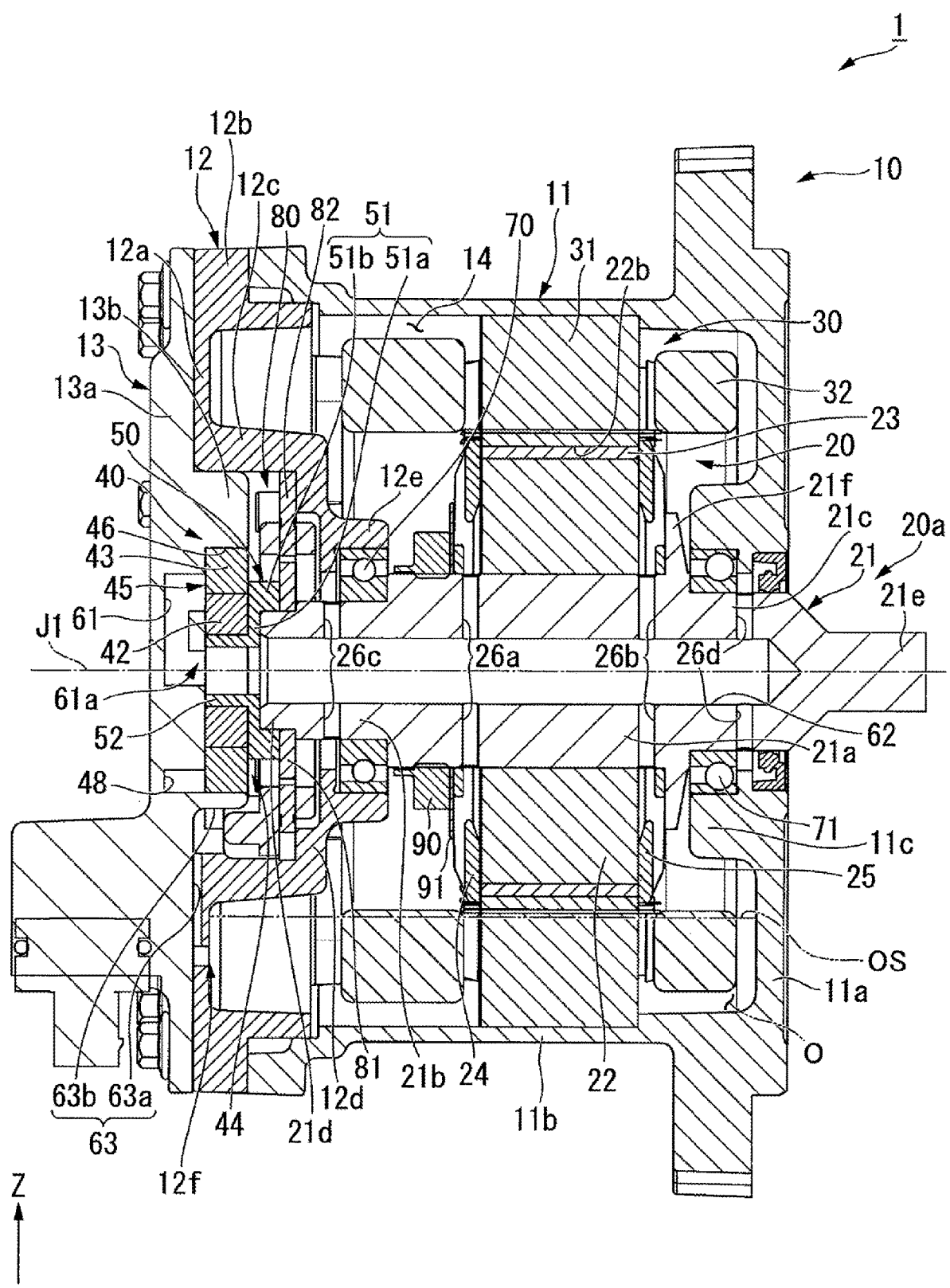
FIG. 1 is a sectional view illustrating a drive device according to an example embodiment of the present disclosure.

As illustrated in FIG. 1, a drive device 1 of the embodiment includes a housing 10, a rotor 20 including a motor shaft 20a disposed along a center axis J1 extending in one direction, a rotation detector 80, a stator 30, a pump 40, and bearings 70, 71.

The center axis J1 extends in a lateral direction of FIG. 1. That is, in the embodiment, the lateral direction in FIG. 1 corresponds to one direction. In the following description, a direction parallel to the center axis J1 is simply referred to as an "axial direction", a radial direction centered on the center axis J1 is simply referred to as a "radial direction", and a circumferential direction centered on the center axis J1 is simply referred to as a "circumferential direction". In the axial direction, a left side in FIG. 1 is referred to as "one side in the axial direction", and a right side in FIG. 1 in the axial direction is referred to as "the other side in the axial direction".

The housing 10 includes a main body 11, an inner lid 12, and an outer lid 13. In the embodiment, the main body 11, the inner lid 12, and the outer lid 13 are a separate member. The main body 11 has a bottomed tubular shape that is open on one side in the axial direction. The main body 11 includes a bottom unit 11a, a main body tube 11b, and a bearing holder 11c. The bottom unit 11a has an annular plate shape expanding in the radial direction. The main body tube 11b has a cylindrical shape extending from a radially outer edge of the bottom unit 11a toward one side in the axial direction. The bearing holder 11c has a cylindrical shape protruding from an inner edge of the bottom unit 11a toward one side in the axial direction. The bearing holder 11c holds the bearing 71 in an inner circumferential surface of the bearing holder 11c.

The inner lid 12 is attached to one side in the axial direction of the main body 11. The inner lid 12 includes an annular plate 12a, an outer tube 12b, an inner tube 12c, an inner tube bottom unit 12d, and a bearing holder 12e. The annular plate 12a has an annular plate shape expanding in the radial direction. The annular plate 12a covers one side in the axial direction of the stator 30. That is, the inner lid 12 covers one side in the axial direction of the stator 30. An opening 12f axially penetrating the annular plate 12a is provided at a lower end of the annular plate 12a. The opening 12f is exposed to an accommodation unit 14 (to be described later).

The outer tube 12b has a cylindrical shape extending from a radially outer edge of the annular plate 12a toward the other side in the axial direction. An end on the other side in the axial direction of the outer tube 12b is fixed while contacting with an end on one side in the axial direction of the main body tube 11b. The inner tube 12c has a cylindrical shape extending from a radially inner edge of the annular plate 12a toward the other side in the axial direction. The inner tube bottom unit 12d has an annular shape expanding radially inward from the end on the other side in the axial direction of the inner tube 12c. The bearing holder 12e has a cylindrical shape projecting from a surface on the other side in the axial direction of the inner tube bottom unit 12d toward the other side in the axial direction. The bearing holder 12e holds the bearing 70 in the inner circumferential surface of the bearing holder 12e. That is, the inner lid 12 holds the bearing 70.

The accommodation unit 14 surrounded by the main body 11 and the inner lid 12 is formed by fixing the main body 11 and the inner lid 12 to each other. That is, the housing 10 includes the accommodation unit 14. The accommodation unit 14 can store oil O while accommodating the rotor 20 and the stator 30. The oil O is stored in a lower region in the vertical direction of the accommodation unit 14. As used herein, "the lower region in the vertical direction of the accommodation unit" includes a portion located below a center in the vertical direction Z of the accommodation unit.

In the embodiment, a liquid level OS of the oil O stored in the accommodation unit 14 is located above the opening 12f. Consequently, the opening 12f is exposed to the oil O stored in the accommodation unit 14. The liquid level OS of the oil O fluctuates by sucking up the oil O using the pump 40, but is disposed below the rotor 20 at least when the rotor 20 rotates. Consequently, when the rotor 20 rotates, the oil O can be prevented from becoming rotational resistance of the rotor 20.

The outer lid 13 is attached to one side in the axial direction of the inner lid 12. The outer lid 13 includes a lid plate 13a and a protrusion 13b. The lid plate 13a has a disc shape expanding in the radial direction. The lid plate 13a covers one side in the axial direction of the motor shaft 20a. That is, the outer lid 13 covers one side in the axial direction of the motor shaft 20a. The radially outer edge of the lid plate 13a is fixed to the radially outer edge of the annular plate 12a. The surface on the other side in the axial direction of the lid plate 13a contacts with the surface on one side in the axial direction of the annular plate 12a. The protrusion 13b protrudes from a central portion of the lid plate 13a toward the other side in the axial direction. The protrusion 13b is inserted and fitted in the inner tube 12c from one side in the axial direction. The protrusion 13b is disposed at an interval on one side in the axial direction of the inner tube bottom unit 12d.

Figure 2:
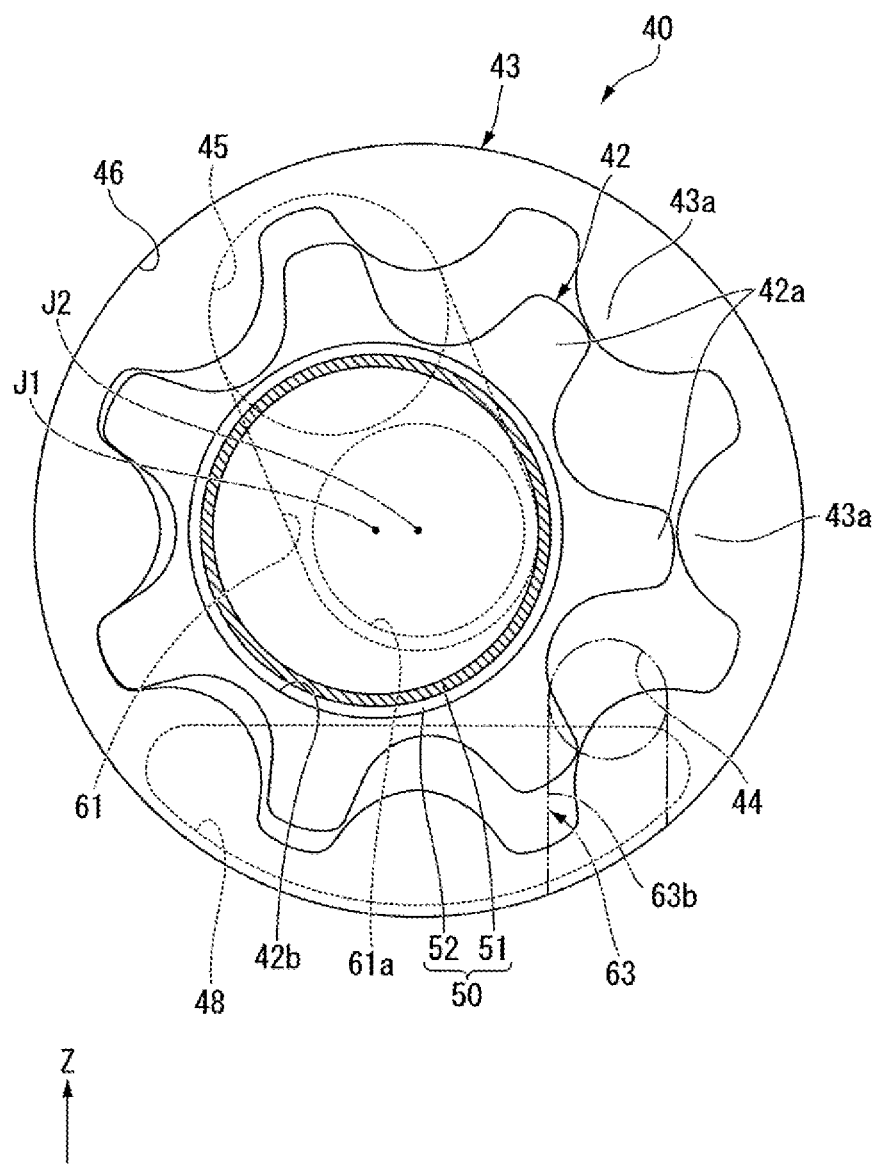
FIG. 2 is a view illustrating a pump of an example embodiment of the present disclosure when the pump is viewed from the other side in an axial direction.

A pump room 46 is provided in the outer lid 13. The pump room 46 is recessed from the surface on the other side in the axial direction of the outer lid 13 toward one side in the axial direction. More particularly, the pump room 46 is recessed from the surface on the other side in the axial direction of the protrusion 13b toward one side in the axial direction. The pump room 46 is disposed on a radial inside of the inner tube 12c. The center axis J1 passes through the pump room 46. As illustrated in FIG. 2, the outer shape of the pump room 46 is a circular shape in axial view. The pump room 46 accommodates an internal gear 43 and an external gear 42 (to be described later).

As illustrated in FIG. 1, the housing 10 includes a first oil passage 61 and a third oil passage 63. In the embodiment, the first oil passage 61 is provided in the outer lid 13. The first oil passage 61 is disposed on one side in the axial direction of the pump room 46. The first oil passage 61 connects an upper end of the pump room 46 and the central portion of the pump room 46 on one side in the axial direction of the pump room 46. The upper end connected to the first oil passage 61 in the pump room 46 is a discharge port 45. That is, the first oil passage 61 is connected to the discharge port 45. The central portion connected to the first oil passage 61 in the pump room 46 is a connection port 61a.

As illustrated in FIG. 2, for example, the discharge port 45 and the connection port 61a have a circular shape. The discharge port 45 is disposed above the connection port 61a. The center axis J1 passes through the connection port 61a.

As illustrated in FIG. 1, the third oil passage 63 extends upward from the opening 12f. The third oil passage 63 is connected to the lower region in the vertical direction of the accommodation unit 14 through the opening 12f. The upper end of the third oil passage 63 is connected to the pump room 46 on the other side in the axial direction of the pump room 46. The portion connected to the third oil passage 63 in the pump room 46 is a suction port 44. That is, the third oil passage 63 connects the lower region in the vertical direction of the accommodation unit 14 and the suction port 44. As illustrated in FIG. 2, for example, the suction port 44 has the circular shape. The suction port 44 is disposed below the discharge port 45 and the connection port 61a. The suction port 44 is disposed below the center axis J1.

As illustrated in FIG. 1, the third oil passage 63 includes a first portion 63a and a second portion 63b. The first portion 63a extends upward from the opening 12f, and is open to the inner circumferential surface at the lower end of the inner tube 12c. For example, the first portion 63a is formed by closing a groove, which is recessed from the surface on one side in the axial direction of the annular plate 12a to the other side in the axial direction and extends in the vertical direction Z, by the surface on the other side in the axial direction of the lid plate 13a. Consequently, the first portion 63a is axially disposed between the inner lid 12 and the outer lid 13.

The second portion 63b is connected to the upper end of the first portion 63a. The second portion 63b is disposed on the radially inside of the inner tube 12c. The second portion 63b is connected to the suction port 44. For example, the second portion 63b is formed by closing an opening on one side in the axial direction of the inner tube 12c using the outer lid 13. Consequently, the second portion 63b is axially disposed between the inner lid 12 and the outer lid 13. In this way, in the embodiment, at least a part of the third oil passage 63 is axially disposed between the inner lid 12 and the outer lid 13. For this reason, at least a part of the third oil passage 63 can be constructed with the inner lid 12 and the outer lid 13, which are fixed to each other, and the third oil passage 63 can easily be manufactured. In the embodiment, the whole third oil passage 63 is axially disposed between the inner lid 12 and the outer lid 13, so that the third oil passage 63 can more easily be manufactured.

The rotor 20 includes a motor shaft 20a, a rotor core 22, a magnet 23, a first end plate 24, and a second end plate 25.

The motor shaft 20a includes a motor shaft body 21 and a closing member 50. The motor shaft body 21 has a columnar shape extending in the axial direction. The motor shaft body 21 includes a large diameter unit 21a, a first intermediate diameter unit 21b, a second intermediate diameter unit 21c, a small diameter unit 21d, and an output unit 21e.

The large diameter unit 21a is a portion to which the rotor core 22 is attached. A male screw portion is provided on the outer circumferential surface at the end on one side in the axial direction of the large diameter unit 21a. A nut 90 is tightened to the male screw portion of the large diameter unit 21a. The first intermediate diameter unit 21b is connected to the large diameter unit 21a on one side in the axial direction of the large diameter unit 21a. An outer diameter of the first intermediate diameter unit 21b is smaller than an outer diameter of the large diameter unit 21a. The end on the other side in the axial direction of the first intermediate diameter unit 21b is journaled by the bearing 70.

The second intermediate diameter unit 21c is connected to the large diameter unit 21a on the other side in the axial direction of the large diameter unit 21a. The outer diameter of the second intermediate diameter unit 21c is smaller than the outer diameter of the large diameter unit 21a. The end on the other side in the axial direction of the second intermediate diameter unit 21c is journaled by the bearing 71. The motor shaft 20a is journaled by the bearings 70, 71. For example, the bearings 70, 71 are a ball bearing.

The small diameter unit 21d is connected to the first intermediate diameter unit 21b on one side in the axial direction of the first intermediate diameter unit 21b. The end on one side in the axial direction of the small diameter unit 21d is the end on one side in the axial direction of the motor shaft body 21. The end on one side in the axial direction of the small diameter unit 21d is disposed on the radial inside of the inner tube 12c. The outer diameter of the small diameter unit 21d is smaller than the outer diameter of the first intermediate diameter unit 21b. That is, the small diameter unit 21d is a portion where the outer diameter decreases toward one side in the axial direction.

The output unit 21e is connected to the second intermediate diameter unit 21c on the other side in the axial direction of the second intermediate diameter unit 21c. The output unit 21e is an end on the other side in the axial direction of the motor shaft body 21. The outer diameter of the output unit 21e is smaller than the outer diameter of the small diameter unit 21d. The output unit 21e axially penetrates the bottom unit 11a to protrude to the outside of the housing 10.

The motor shaft body 21 includes a flange 21f. The flange 21f protrudes radially outward from the outer circumferential surface of the large diameter unit 21a. The flange 21f has the annular plate shape that is provided over a whole circumference of the outer circumferential surface of the large diameter unit 21a. The flange 21f is provided at the end on the other side in the axial direction of the large diameter unit 21a.

The closing member 50 is fixed to the motor shaft body 21 on one side in the axial direction of the motor shaft body 21. The closing member 50 has a tubular shape fitted in the motor shaft body 21. More particularly, the closing member 50 has a cylindrical shape centered on the center axis J1, and is fitted in and fixed to the small diameter unit 21d from one side in the axial direction. The closing member 50 is open to both axial sides. The closing member 50 is disposed on the radial inside of the inner tube 12c.

The closing member 50 includes a closing body 51 and a fixing unit 52. The closing body 51 has the tubular shape fitted in and fixed to the small diameter unit 21d. The closing body 51 includes a closing lid 51a and a fitting unit 51b. The closing lid 51a has the annular plate shape expanding radially centered on the center axis J1. The closing lid 51a closes a part of the opening on the other side in the axial direction of the pump room 46. That is, the closing member 50 closes at least a part of the opening on the other side in the axial direction of the pump room 46. In the embodiment, the outer diameter of the closing lid 51a is smaller than the inner diameter of the pump room 46. For this reason, the closing lid 51a closes a part of the radial inside in the opening on the other side in the axial direction of the pump room 46.

The radially outer edge of the closing lid 51a overlaps the internal gear 43 in axial view. That is, the closing member 50 overlaps the internal gear 43 in axial view. The closing lid 51a supports the internal gear 43 from the other side in the axial direction. An end face on one side in the axial direction of the small diameter unit 21d contacts with the surface on the other side in the axial direction of the closing lid 51a. The fitting unit 51b has the cylindrical shape extending from the radially outer edge of the closing lid 51a toward the other side in the axial direction. The fitting unit 51b is fitted in the small diameter unit 21d from the radial outside.

The fixing unit 52 has the tubular shape extending from the closing body 51 toward one side in the axial direction. More particularly, the fixing unit 52 has the cylindrical shape extending from the radially inner edge of the closing lid 51a toward one side in the axial direction around the center axis J1. The fixing unit 52 has the outer diameter smaller than that of the closing body 51. The fixing unit 52 is inserted into the pump room 46. The end face on one side in the axial direction of the fixing unit 52 contacts with the surface on one side in the axial direction of the pump room 46. The opening on one side in the axial direction of the fixing unit 52 is connected to the connection port 61a while axially opposed to the connection port 61a.

The motor shaft 20a has a second oil passage 62 provided in the motor shaft 20a. The second oil passage 62 is a bottomed hole that is recessed from the end on one side in the axial direction of the motor shaft 20a toward the other side in the axial direction. The second oil passage 62 is open to one side in the axial direction. The second oil passage 62 extends from the end on one side in the axial direction of the closing member 50 to the end on the other side in the axial direction of the second intermediate diameter unit 21c, and is provided over the closing member 50 and the motor shaft body 21. The inside of the fixing unit 52 and the hole recessed from the end on one side in the axial direction of the motor shaft body 21 toward the other side in the axial direction are connected to each other in the axial direction to form the second oil passage 62. That is, the radially inside surface of the closing member 50 constitutes a part of the radially inside surface of the second oil passage 62.

In the embodiment, the inner edge of the second oil passage 62 in a section orthogonal to the axial direction has the circular shape centered on the center axis J1. The inner diameter of the portion of the second oil passage 62 provided in the closing member 50 is smaller than the inner diameter of the portion of the second oil passage 62 provided in the motor shaft body 21. That is, the inner diameter of the fixing unit 52 is smaller than the inner diameter of the hole constituting the second oil passage 62 provided in the motor shaft body 21. The opening on one side in the axial direction of the fixing unit 52 is connected to the connection port 61a, which allows the connection between the second oil passage 62 and the first oil passage 61. That is, the second oil passage 62 is open to the first oil passage 61 at the end on one side in the axial direction of the motor shaft 20a.

Figure 3:
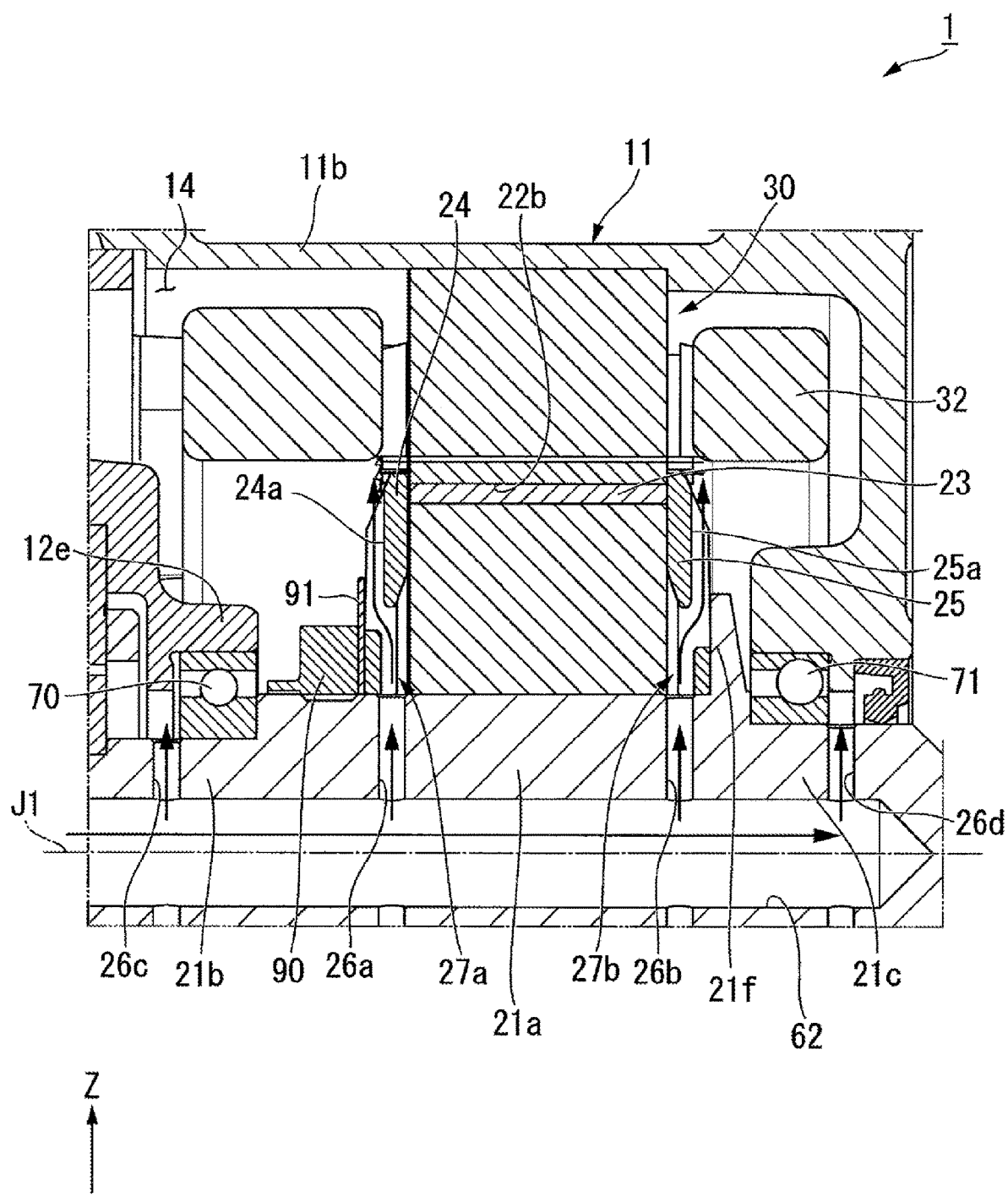
FIG. 3 is a sectional view illustrating a portion of a drive device of an example embodiment of the present disclosure.

The motor shaft 20a includes first through-holes 26a to 26d connecting the second oil passage 62 and the outer circumferential surface of the motor shaft 20a. The first through-holes 26a to 26d extend in the radial direction. The first through-holes 26a, 26b are made in the large diameter unit 21a. The first through-holes 26a, 26b are axially disposed between the nut 90 and the flange 21f. As illustrated in FIG. 3, the radially outside end of the first through-hole 26a is open to an axial gap 27a between the first end plate 24 and the rotor core 22. The radially outside end of the first through-hole 26b is open to an axial gap 27b between the second end plate 25 and the rotor core 22.

The first through-hole 26c is made in the first intermediate diameter unit 21b. The radially outside end of the first through-hole 26c is open to the radial inside of the bearing holder 12e on one side in the axial direction of the bearing 70. The first through-hole 26d is made in the second intermediate diameter unit 21c. The radially outside end of the first through-hole 26d is open to the radial inside of the bearing holder 11c on the other side in the axial direction of the bearing 71. For example, a plurality of the first through-holes 26a to 26d is made along the circumferential direction.

As illustrated in FIG. 1, the rotor core 22 has the annular shape fixed to the motor shaft body 21. In the embodiment, the rotor core 22 is fitted in the large diameter unit 21a. The rotor core 22 includes a magnet insertion hole 22b axially penetrating the rotor core 22. A plurality of magnet insertion holes 22b is provided along the circumferential direction. The magnet 23 is inserted into the magnet insertion hole 22b.

The first end plate 24 and the second end plate 25 have the annular plate shape expanding in the radial direction. The large diameter unit 21a is inserted into the first end plate 24 and the second end plate 25. The first end plate 24 and the second end plate 25 axially sandwich the rotor core 22 while contacting with the rotor core 22.

As illustrated in FIG. 3, the first end plate 24 is disposed on one side in the axial direction of the rotor core 22. The radially outer edge of the first end plate 24 protrudes to the other side in the axial direction, and contacts with the radially outer edge in the surface on one side in the axial direction of the rotor core 22. The outer edge in the radial direction of the first end plate 24 axially overlaps the opening on one side in the axial direction of the magnet insertion hole 22b, and presses the magnet 23 inserted into the magnet insertion hole 22b from one side in the axial direction. A radially inside portion with respect to the outer edge in the radial direction of the first end plate 24 is axially opposed to the surface on one side in the axial direction of the rotor core 22 with a gap 27a interposed therebetween.

The first end plate 24 includes an exhaust groove 24a recessed from the surface on one side in the axial direction of the first end plate 24 toward the other side in the axial direction. The exhaust groove 24a extends in the radial direction. The radially inside end of the exhaust groove 24a axially penetrates the first end plate 24, and is connected to the gap 27a. The radially outside end of the exhaust groove 24a is open to the radial outside of the first end plate 24, and is radially opposed to the coil 32 (to be described later) with a gap interposed therebetween. The opening on one side in the axial direction in the portion on the radial inside of the exhaust groove 24a is closed by a washer 91 that is fixed while axially sandwiched between the nut 90 and the first end plate 24. The washer 91 has the annular plate shape expanding in the radial direction.

The second end plate 25 is disposed on the other side in the axial direction of the rotor core 22. The radially outer edge of the second end plate 25 protrudes to one side in the axial direction, and contacts with the radially outer edge in the surface on the other side in the axial direction of the rotor core 22. The outer edge in the radial direction of the second end plate 25 axially overlaps the opening on the other side in the axial direction of the magnet insertion hole 22b, and presses the magnet 23 inserted into the magnet insertion hole 22b from the other side in the axial direction. Consequently, both sides in the axial direction of the magnet 23 inserted into the magnet insertion hole 22b are pressed by the first end plate 24 and the second end plate 25. Thus, the magnet 23 can be prevented from coming out of the magnet insertion hole 22b.

A radially inside portion with respect to the outer edge in the radial direction of the second end plate 25 is axially opposed to the surface on the other side in the axial direction of the rotor core 22 with a gap 27b interposed therebetween. The second end plate 25 includes exhaust grooves 25a recessed from the surface on the other side in the axial direction of the second end plate 25 toward one side in the axial direction. The exhaust groove 25a extends in the radial direction. The radially inside end of the exhaust groove 25a axially penetrates the second end plate 25, and is connected to the gap 27b. The radially outside end of the exhaust groove 25a is open to the radial outside of the second end plate 25, and is radially opposed to the coil 32 (to be described later) with a gap interposed therebetween. The opening on the other side in the axial direction in the radial inside portion of the exhaust groove 25a is closed by the flange 21f.

The first end plate 24, the rotor core 22, and the second end plate 25 are axially sandwiched between the nut 90 and the washer 91 and the flange 21f. The nut 90 is tightened into the male screw portion of the large diameter unit 21a, which allows the nut 90 to press the first end plate 24, the rotor core 22, and the second end plate 25 against the flange 21f with the washer 91 interposed therebetween. Consequently, the first end plate 24, the rotor core 22, and the second end plate 25 are fixed to the motor shaft 20a.

The rotation detector 80 in FIG. 1 detects rotation of the rotor 20. In the embodiment, for example, the rotation detector 80 is a Variable Reluctance (VR) type resolver. The rotation detector 80 is disposed on the radial inside of the inner tube 12c. The rotation detector 80 includes a detection target unit 81 and a sensor 82.

The detection target unit 81 has an annular shape extending in the circumferential direction. The detection target unit 81 is fitted in and fixed to the motor shaft 20a. More particularly, the detection target unit 81 is fitted in and fixed to the small diameter unit 21d. The surface on the other side in the axial direction at the radially inner edge of the detection target unit 81 contacts with a step between the first intermediate diameter unit 21b and the small diameter unit 21d. The surface on one side in the axial direction at the radially inner edge of the detection target unit 81 contacts with the end face on the other side in the axial direction of the fitting unit 51b. That is, the detection target unit 81 is axially sandwiched while contacting the closing member 50 and the step on the other side in the axial direction of the small diameter unit 21d. For this reason, the detection target unit 81 is held by the motor shaft 20a while positioned in the axial direction, and is prevented from coming out from the motor shaft body 21 to one side in the axial direction. The detection target unit 81 is made of a magnetic material.

The sensor 82 is axially disposed between the inner lid 12 and the outer lid 13. More particularly, the sensor 82 is fixed to the surface on one side in the axial direction of the inner tube bottom unit 12d on the radial inside of the inner tube 12c. That is, the sensor 82 is attached to the inner lid 12. For this reason, the sensor 82 is easy to be attached. The sensor 82 has the annular shape surrounding the radial outside of the detection target unit 81. The sensor 82 includes a plurality of coils along the circumferential direction. When the detection target unit 81 rotates together with the motor shaft 20a, an induced voltage corresponding to the circumferential position of the detection target unit 81 is generated in the coil of the sensor 82. The sensor 82 detects the rotation of the detection target unit 81 by detecting the induced voltage. Consequently, the rotation detector 80 detects the rotation of the motor shaft 20*a*, and detects the rotation of the rotor 20.

The stator 30 is radially opposed to the rotor 20 with the gap interposed therebetween. The stator 30 includes the stator core 31 and the plurality of coils 32 mounted on the stator core 31. The stator core 31 has the annular shape centered on the center axis J1. The outer circumferential surface of the stator core 31 is fixed to the inner circumferential surface of the main body tube 11*b*. The stator core 31 is opposed to the radial outside of the rotor core 22 with the gap interposed therebetween.

The pump 40 is provided in the central portion of the outer lid 13. The pump 40 is disposed on one side in the axial direction of the motor shaft 20*a*. The pump 40 includes the external gear 42, the internal gear 43, the pump room 46 described above, a suction port 44, a discharge port 45, and a storage unit 48. The external gear 42 is a gear that is rotatable about the center axis J1. The external gear 42 is fixed to one end in the axial direction of the motor shaft 20*a*. More particularly, the external gear 42 is fixed to the outer circumferential surface of the fixing unit 52. For this reason, the external gear 42 can be fixed to the motor shaft body 21 with the closing member 50 interposed therebetween. Consequently, by adjusting a size of the closing member 50, the external gear 42 can be fixed to the motor shaft body 21 without changing the sizes of the motor shaft body 21 and the external gear 42.

The surface on the other side in the axial direction of the external gear 42 contacts with the surface on one side in the axial direction of the closing lid 51*a*. The external gear 42 is accommodated in the pump room 46. As illustrated in FIG. 2, the external gear 42 includes a plurality of teeth 42*a* on the outer circumferential surface of the external gear 42. A tooth shape of the tooth 42*a* of the external gear 42 is a trochoidal tooth shape.

The internal gear 43 is an annular gear which is rotatable about a rotation axis J2 eccentric to the center axis J1. The internal gear 43 is accommodated in the pump room 46. The internal gear 43 surrounds the radial outside of the external gear 42, and meshes with the external gear 42. The internal gear has a plurality of teeth 43*a* on the inner circumferential surface of the internal gear 43. The tooth shape of the tooth 43*a* of the internal gear 43 is the trochoidal tooth shape. In this way, the tooth 42*a* of the external gear 42 and the tooth 43*a* of the internal gear 43 have the trochoidal tooth shape, so that a trochoid pump can be constructed. Thus, noise generated from the pump 40 can be reduced, and pressure and an amount of oil O discharged from the pump 40 can easily be stabilized.

As described above, the suction port 44 is connected to the third oil passage 63. As illustrated in FIG. 1, the suction port 44 is open to the other side in the axial direction of the pump room 46. The suction port 44 is connected to the gap between the external gear 42 and the internal gear 43. The suction port 44 can suck the oil O stored in the accommodation unit 14 into the pump room 46, more particularly, the gap between the external gear 42 and the internal gear 43 through the opening 12*f* and the third oil passage 63. As illustrated in FIG. 2, the suction port 44 is disposed above the lower end of the storage unit 48 and above the lower end of the external gear 42.

As described above, the discharge port 45 is connected to the first oil passage 61. As illustrated in FIG. 1, the discharge port 45 is open to one side in the axial direction of the pump room 46. The discharge port 45 is connected to the gap between the external gear 42 and the internal gear 43. The discharge port 45 allows the oil O to be discharged from the pump room 46, more particularly, the gap between the external gear 42 and the internal gear 43.

The storage unit 48 is connected to the pump room 46 on one side in the axial direction of the lower region in the vertical direction of the pump room 46. As illustrated in FIG. 2, the storage unit 48 has a bow shape protruding downward in axial view. A part of the oil O sucked from the suction port 44 into the pump room 46 flows into the storage unit 48.

Because the suction port 44 is disposed above the lower end of the storage unit 48, even if the pump 40 stops, at least a part of the oil O flowing into the storage unit 48 is stored in the storage unit 48 without returning from the suction port 44 to the accommodation unit 14. Consequently, when the pump 40 stops, the lower portions of the external gear 42 and the internal gear 43 in the pump room 46 can contact with the oil O in the storage unit 48. Thus, when the pump 40 is driven again, the oil O can be interposed between the tooth 42*a* of the external gear 42 and the tooth 43*a* of the internal gear 43 and between the inner circumferential surface of the pump room 46 and the outer circumferential surface of the internal gear 43, and generation of seizure can be prevented.

When the rotor 20 rotates to rotate the motor shaft 20*a*, the external gear 42 fixed to the motor shaft 20*a* rotates. Consequently, the internal gear 43 meshing with the external gear 42 rotates to send the oil O sucked from the suction port 44 into the pump room 46 to the discharge port 45 through between the external gear 42 and the internal gear 43. In this way, the pump 40 is driven through the motor shaft 20*a*. The oil O discharged from the discharge port 45 flows into the first oil passage 61, and flows from the connection port 61*a* to the second oil passage 62. As indicated by an arrow in FIG. 3, the oil O flowing into the second oil passage 62 receives radially outside force due to centrifugal force of the rotating motor shaft 20*a*, and flows to the outside of the motor shaft 20*a* through the first through-holes 26*a* to 26*d*.

In the embodiment, because the first through-hole 26*a* is open in the axial gap 27*a* between the first end plate 24 and the rotor core 22, the oil O flowing out from the first through-hole 26*a* flows into the gap 27*a*. The oil O flowing into the gap 27*a* is exhausted radially outward from the exhaust groove 24*a*. In the embodiment, because the opening on one side in the axial direction of the radially inside portion of the exhaust groove 24*a* is closed by the washer 91, the oil O flowing into the exhaust groove 24*a* is easily guided radially outward by the washer 91.

Because the first through-hole 26*b* is open to the axial gap 27*b* between the second end plate 25 and the rotor core 22, the oil O flowing out from the first through-hole 26*b* flows into the gap 27*b*. The oil O flowing into the gap 27*b* is exhausted radially outward from the exhaust groove 25*a*. In the embodiment, because the opening on the other side in the axial direction in the radially inside portion of the exhaust groove 25*a* is closed by the flange 21*f*, the oil O flowing into the exhaust groove 25*a* is easily guided radially outward by the flange 21*f*.

The oil O exhausted radially outward from the exhaust grooves 24*a*, 25*a* is blown onto the coil 32. This enables the oil O to cool the coil 32. In the embodiment, the second oil passage 62 is provided in the motor shaft 20*a*, so that the rotor 20 can also be cooled by the oil O until the oil O is exhausted from the exhaust grooves 24*a*, 25*a*. As described above, in the present embodiment, the oil O discharged from the discharge port 45 is guided to the rotor 20 and the stator 30.

Because the first through-hole 26*c* is open to the radial inside of the bearing holder 12*e*, the oil O flowing out from the first through-hole 26c is supplied to the bearing 70. Because the first through-hole 26d is open to the radial inside of the bearing holder 11c, the oil O flowing out from the first through-hole 26d is supplied to the bearing 71. Consequently, the oil O can be used as a lubricant for the bearings 70, 71.

FIG. 3 illustrates an example in which the oil O is exhausted upward from the exhaust grooves 24a, 25a. However, the present invention is not limited to this configuration. Because the rotor 20 rotates, the circumferential positions of the exhaust grooves 24a and 25a change in association with the rotation of the rotor 20. Consequently, the direction of the oil O exhausted from the exhaust grooves 24a, 25a changes to the circumferential direction, and the plurality of coils 32 arranged along the circumferential direction can be cooled by the oil O.

As described above, the pump 40 can be driven by the rotation of the motor shaft 20a, and the oil O stored in the housing 10 can be sucked up by the pump 40, and supplied to the rotor 20, the stator 30, and the bearings 70, 71. Consequently, the rotor 20 and the stator 30 can be cooled using the oil O stored in the housing 10, and lubricity between the bearings 70, 71 and the motor shaft body 21 can be improved. The oil O supplied to the stator 30 and the bearings 70, 71 drops in the accommodation unit 14, and is stored in the lower region of the accommodation unit 14 again. This allows circulation of the oil O in the accommodation unit 14.

For example, conventionally, the opening of the pump room on the side on which the motor shaft is inserted is hardly closed when the external gear is inserted into the pump room while the external gear is fixed to the motor shaft. For this reason, for example, it is necessary to insert the external gear into the pump room from the open side of the pump room to fix the external gear to the motor shaft after the motor shaft is inserted into the pump room through the hole made on the closed side of the pump room. Thus, it takes a long time to assemble the drive device, and there is a problem in that the structure of the drive device tends to be complicated.

On the other hand, in the embodiment, at least a part of the opening on the other side in the axial direction of the pump room 46 is closed by the closing member 50 of the motor shaft 20a. For this reason, the end on one side in the axial direction of the motor shaft 20a is inserted into the pump room 46 together with the external gear 42 while the external gear 42 is fixed to the motor shaft 20a, so that the external gear 42 can be disposed in the pump room 46 while the opening on the other side in the axial direction of the pump room 46 can simultaneously be closed by the closing member 50. Thus, the labor of the assembly of the drive device 1 can be reduced, and the complication of the structure of the drive device 1 can easily be prevented.

Because the closing member 50 that closes the pump room 46 rotates together with the external gear 42, the closing member moves in the same circumferential direction as the circumferential direction in which the oil O is carried with respect to the oil O carried by flowing between the external gear 42 and the internal gear 43. Consequently, the oil O in the pump room 46 is easily sent from the suction port 44 to the discharge port 45.

In the embodiment, the oil O discharged from the discharge port 45 can be sent to the inside of the motor shaft 20a by providing the first oil passage 61 and the second oil passage 62. The first through-holes 26a to 26d are made, so that the oil O flowing into the second oil passage 62 can be supplied to the stator 30 and the bearings 70, 71.

In the embodiment, the second oil passage 62 provided in the motor shaft 20a is open to the first oil passage 61 connected to the discharge port 45 at the end on one side in the axial direction of the motor shaft 20a. Because the external gear 42 is fixed to the end on one side in the axial direction of the motor shaft 20a, the end on one side in the axial direction of the motor shaft 20a is disposed at a position relatively close to the discharge port 45. Thus, the first oil passage 61 connecting the discharge port 45 and the second oil passage 62 can be shortened. For this reason, in the embodiment, a total length of the oil passage from the opening 12f to the second oil passage 62 is easily shortened. Consequently, the structure of the drive device 1 can easily be simplified, and the manufacturing of the drive device 1 can be facilitated.

In the embodiment, the radially inside surface of the closing member 50 constitutes a part of the radially inside surface of the second oil passage 62. For this reason, the oil O can flow from the closing member 50 into the second oil passage 62 while the external gear 42 is fixed to the closing member 50. Consequently, as described above, the motor shaft body 21 and the external gear 42 can be fixed with the closing member 50 interposed therebetween without changing the sizes of the motor shaft body 21 and the external gear 42, and the second oil passage 62 is easily open to the first oil passage 61.

The present invention is not limited to the above embodiment, but other configurations may be adopted. The closing member 50 may close the whole opening on the other side in the axial direction of the pump room 46. In this case, the outer diameter of the closing lid 51a is greater than or equal to the inner diameter of the pump room 46. When a part of the opening on the other side in the axial direction of the pump room 46 is closed by the closing member 50, another part of the opening on the other side in the axial direction of the pump room 46 may be closed by a member other than the closing member 50. The external gear 42 may directly be fixed to the motor shaft body 21 with no use of the closing member 50. In this case, for example, the second oil passage 62 may be provided only in the motor shaft body 21.

The rotor core 22 may be fixed to the outer circumferential surface of the motor shaft body 21 by press fitting or the like. In this case, the first end plate 24 and the second end plate 25 may not be provided. In this case, the oil O flowing out from the first through-holes 26a, 26b may directly be supplied to the coil 32, or a hole connected to the first through-hole 26a may be provided in the rotor core 22 to supply the oil O to the coil 32 through the hole of the rotor core 22. The oil O may be supplied to the stator core 31.

A place to which the oil O discharged from the discharge port 45 is supplied is not particularly limited, and the oil O may be supplied to only one or two of the rotor 20, the stator 30, and the bearings 70, 71, or may not be supplied to any. For example, the oil O discharged from the discharge port 45 may be supplied to the inside surface of the upper region in the vertical direction of the accommodation unit 14. In this case, the stator 30 can indirectly be cooled by cooling the housing 10. At least one of the first through-holes 26a to 26d may not be made. The tooth 42a of the external gear 42 and the tooth 43a of the internal gear 43 may have a cycloid tooth shape or an involute tooth shape.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A drive device comprising:
   a rotor including a motor shaft disposed along a center axis extending in one direction and a rotor core fixed to the motor shaft;
   a stator radially opposed to the rotor with a gap interposed between the stator and the rotor;
   a housing including an accommodation portion to store oil while accommodating the rotor and the stator; and
   a pump driven through the motor shaft; wherein
   the housing includes an outer lid that covers one side in an axial direction of the motor shaft;
   the pump includes:
      an external gear fixed to an end on one side in the axial direction of the motor shaft;
      an internal gear surrounding a radial outside of the external gear and meshing with the external gear;
      a pump room recessed from a surface on the other side in the axial direction of the outer lid toward one side in the axial direction, the pump room accommodating the internal gear and the external gear;
      a suction port through which the oil is to be sucked into the pump room; and
      a discharge port through which the oil is to be discharged from the pump room;
   the motor shaft includes:
      a motor shaft body to which the rotor core is fixed; and
      a closer fixed to the motor shaft body such that the closer rotates together with the motor shaft body; and
   the closer overlaps the internal gear in an axial view and closes at least a portion of an opening on the other side in the axial direction of the pump room.

2. The drive device according to claim 1, wherein the closer includes:
   a tubular closing body that closes the pump room; and
   a fixer having a tubular shape extending from the closing body toward one side in the axial direction and having an outer diameter smaller than that of the closing body; and
   the external gear is fixed to an outer circumferential surface of the fixer.

3. The drive device according to claim 1, further comprising a rotation detector to detect rotation of the rotor, the rotation detector including:
   an annular detection target that is fitted in and fixed to the motor shaft; and
   a sensor that detects rotation of the detection target;
   the motor shaft body includes a reduced diameter portion in which an outside diameter decreases toward one side in the axial direction;
   the closer has a cylindrical shape fitted in and fixed to the reduced diameter portion; and
   the detection target is fitted in the reduced diameter portion, and sandwiched in the axial direction while contacting with the closer and a step on the other side in the axial direction of the reduced diameter portion.

4. The drive device according to claim 1, wherein
   the housing includes a first oil passage connected to the discharge port;
   the motor shaft includes:
      a second oil passage provided in the motor shaft and connected to the first oil passage; and
      a first through-hole connecting the second oil passage and an outer circumferential surface of the motor shaft;
   the first oil passage is disposed on one side in the axial direction of the pump room; and
   the second oil passage is open to the first oil passage at an end on one side in the axial direction of the motor shaft.

5. The drive device according to claim 4, wherein
   the closer has a tubular shape that is open to both sides in the axial direction and is fitted in the motor shaft body; and
   a radially inside surface of the closer defines a portion of a radially inside surface of the second oil passage.

6. The drive device according to claim 1, wherein the housing includes:
   an inner lid that holds a bearing journaling the motor shaft and covers one side in the axial direction of the stator; and
   an oil passage connecting a lower region in the vertical direction of the accommodation portion and the suction port;
   the outer lid is attached to one side in the axial direction of the inner lid; and
   at least a portion of the oil passage is axially disposed between the inner lid and the outer lid.

7. The drive device according to claim 6, further comprising a rotation detector to detect rotation of the rotor, the rotation detector including:
   an annular detection target that is fitted in and fixed to the motor shaft; and
   a sensor that detects rotation of the detection target; and
   the sensor is attached to the inner lid.

8. The drive device according to claim 1, wherein
   the pump includes a storage connected to the pump room on one side in the axial direction in a lower region in the vertical direction of the pump room; and
   the suction port is disposed vertically above at end on a lower side in the vertical direction of the storage and vertically above an end on a lower side in the vertical direction of the external gear.

* * * * *